US011613264B2

United States Patent
Ansari et al.

(10) Patent No.: US 11,613,264 B2
(45) Date of Patent: Mar. 28, 2023

(54) TRANSMIT-SIDE MISBEHAVIOR CONDITION MANAGEMENT

(71) Applicant: QUALCOMM Incorporated, San Diego, CA (US)

(72) Inventors: Mohammad Raashid Ansari, Lowell, MA (US); Jonathan Petit, Wenham, MA (US); Jean-Philippe Monteuuis, Levallois-Perret (FR); Cong Chen, Shrewsbury, MA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 17/172,463

(22) Filed: Feb. 10, 2021

(65) Prior Publication Data
US 2022/0250633 A1 Aug. 11, 2022

(51) Int. Cl.
| B60W 50/032 | (2012.01) |
| H04W 4/40 | (2018.01) |
| B60W 50/02 | (2012.01) |
| G07C 5/00 | (2006.01) |
| G07C 5/08 | (2006.01) |
| B60W 50/00 | (2006.01) |

(52) U.S. Cl.
CPC ...... *B60W 50/032* (2013.01); *B60W 50/0205* (2013.01); *G07C 5/008* (2013.01); *G07C 5/0841* (2013.01); *H04W 4/40* (2018.02); *B60W 2050/0083* (2013.01); *B60W 2556/45* (2020.02)

(58) Field of Classification Search
CPC .................................................. B60W 50/032
See application file for complete search history.

(56) References Cited

U.S. PATENT DOCUMENTS

| 10,120,003 | B2* | 11/2018 | Haran | G01S 19/215 |
| 10,489,992 | B2* | 11/2019 | Weimerskirch | G07C 5/008 |
| 11,145,146 | B2* | 10/2021 | Mercep | B60W 50/0225 |
| 11,178,525 | B2* | 11/2021 | Kim | H04W 4/20 |
| 11,196,768 | B2* | 12/2021 | Alexander | H04L 63/14 |
| 11,290,470 | B2* | 3/2022 | Petit | H04L 67/12 |
| 11,303,458 | B2* | 4/2022 | Barrett | H04W 12/069 |
| 11,407,423 | B2* | 8/2022 | Liu | B60W 30/14 |
| 2017/0365171 | A1 | 12/2017 | Haran | |

(Continued)

OTHER PUBLICATIONS

International Search Report and Written Opinion—PCT/US2021/061128—ISA/EPO—dated Feb. 25, 2022; 17 pages.

(Continued)

*Primary Examiner* — Michaela Berns
(74) *Attorney, Agent, or Firm* — The Marbury Law Group, PLLC

(57) ABSTRACT

In various embodiments, a vehicle-to-everything (V2X) processing device detecting a misbehavior condition in a system of the vehicle, and prevent the vehicle from sending a V2X message related to the detected misbehavior condition in response to detecting the misbehavior condition in the system of the vehicle. In some embodiments, the V2X processing device may receive information from a plurality of information sources of the vehicle, and may detect the misbehavior condition in the system of the vehicle by performing a cross-check of information received from the plurality of information sources of the vehicle to detect an inconsistency within the received information.

30 Claims, 11 Drawing Sheets

(56) References Cited

U.S. PATENT DOCUMENTS

2018/0322711 A1 11/2018 Weimerskirch
2019/0245705 A1* 8/2019 Kumar ................ H04L 63/0823
2019/0312896 A1* 10/2019 Petit .................... H04L 63/1416
2020/0258320 A1 8/2020 Lu et al.

OTHER PUBLICATIONS

LECIT Consulting, S.R.L: "New Draft TR103460_for_Discussion", ETSI Draft, ITSWG5(20)000057, European Telecommunications Standards Institute (ETSI), Sophia-Antipolis, France, vol. WG ITS WG5 Security, No. 0.14, Jun. 5, 2020, XP014368038, pp. 1-36, Retrieved from the Internet: URL: docbox.etsi.org/ITS/ITSWG5/05-Contributions/2020/ITSWG5(20)000057_Draft_-_DTR_ITS-00539__v0_0_14_TR_103_460___Misbehavior_de/ITS-00539v0014.docx [retrieved on Jun. 5, 2020] p. 2 0, Paragraph 6-p. 2 6, Paragraph 7.1.

\* cited by examiner

Example protocol stack and related core standards for C-ITS in Europe

TRANSMIT-SIDE MISBEHAVIOR CONDITION MANAGEMENT

BACKGROUND

Multiple regions of the world are developing standards for vehicle-based communication systems and functionality. Standards developed in Institute of Electrical and Electronics Engineers (IEEE) and Society of Automotive Engineers (SAE) for use in North America, or in European Telecommunications Standards Institute (ETSI) and European Committee for Standardization (CEN) for use in Europe. The IEEE 802.11p standard is the basis for the Dedicated Short Range Communication (DSRC) and ITS-G5 communication standards. IEEE 1609 is a higher layer standard based on IEEE 802.11p. The Cellular Vehicle-to-Everything (C-V2X) standard is a competing standard developed under the auspices of the 3rd Generation Partnership Project. These standards serve as the foundation for vehicle-based wireless communications, and may be used to support intelligent highways, autonomous and semi-autonomous vehicles, and improve the overall efficiency and safety of the highway transportation systems. Other V2X wireless technologies are also under consideration in different regions of the world. The techniques described herein are applicable to any V2X wireless technology.

The C-V2X protocol defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated Intelligent Transportation System (ITS) 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems. LTE-Advanced systems, mobile Worldwide Interoperability for Microwave Access (mobile WiMAX) systems, etc.), fifth generation new radio wireless mobile communication technologies (5G NR systems, etc.), etc.

An element of V2X systems is the ability for a vehicle to broadcast Basic Safety Messages (BSM) in North America or Cooperative Awareness Messages (CAM) in Europe, which other vehicles can receive and process to improve traffic safety. The processing of such messages in the transmitting and receiving vehicles occurs in onboard equipment that provide the vehicle-to-everything (V2X) functionality (referred to herein as "V2X onboard equipment").

In V2X communications, it is important that inaccurate, corrupted, or hacked (i.e., bad) data is detected in order to prevent such inaccurate data from further dissemination. However, as an increasing number of vehicles are equipped to participate in such networks, the volume of potential misbehavior condition data is large and growing at an exponential rate. Thus, the management of such detected misbehavior conditions may be controlled through the use of misbehavior detection systems or functionality in order to effectively utilize V2X messaging. Current misbehavior detection systems rely on a device or vehicle receiving V2X signaling to detect misbehavior (i.e., receiver-side methods) of a device or vehicle that transmits spurious or inaccurate V2X messages (i.e., a transmitting device or vehicle). Receiver-side techniques for such misbehavior detection, while crucially important, do not provide security for the remainder of the network (i.e., devices and vehicles other than the receiver device).

SUMMARY

Various aspects include methods of misbehavior condition management performed by a vehicle-to-everything (V2X) processing device. Various aspects may include detecting a misbehavior condition in a system of the vehicle, and preventing the vehicle from sending a V2X message related to the detected misbehavior condition in response to detecting the misbehavior condition in the system of the vehicle. Some aspects may further include transmitting to a management entity a misbehavior report indicating the detected misbehavior condition in response to detecting the misbehavior condition in the system of the vehicle.

In some aspects, detecting a misbehavior condition in a system of the vehicle may include receiving information from a plurality of information sources of the vehicle, and detecting the misbehavior condition in the system of the vehicle by performing a cross-check of information received from the plurality of information sources of the vehicle to detect an inconsistency within the received information. In some aspects, the plurality of information sources of the vehicle may include one or more of an in-vehicle network, a vehicle sensor, a vehicle actuator, radio frequency (RF) module, or a previously transmitted V2X message.

In some aspects, preventing the vehicle from sending a V2X message related to the detected misbehavior condition in response to detecting the misbehavior condition in the system of the vehicle may include identifying a value that is received from a vehicle element and that is associated with the detected misbehavior condition, and preventing the identified value from being used in a V2X message to be sent by the vehicle.

In some aspects, preventing the vehicle from sending a V2X message related to the detected misbehavior condition in response to detecting the misbehavior condition in the system of the vehicle may include identifying a vehicle element that is a source of the detected misbehavior condition, and preventing information from the identified vehicle element from being used in a V2X message to be sent by the vehicle. Some aspects may further include adding the identified vehicle element to a blocking list indicating that information from the identified vehicle element should not be used for generating V2X messages.

In some aspects, detecting a misbehavior condition in a system of the vehicle may include detecting an inconsistency between an RF profile of the RF module and an RF module transmit configuration, and preventing the vehicle from sending a V2X message related to the detected misbehavior condition in response to detecting the misbehavior condition in the system of the vehicle may include preventing the vehicle from sending a V2X message using the RF module transmit configuration.

Some aspects may further include re-calibrating one or more sensors of the vehicle in response to detecting the misbehavior condition in the system of the vehicle.

Further aspects include a misbehavior management system including a memory and a processor configured to perform operations of any of the methods summarized above. Further aspects may include a misbehavior management system having various means for performing functions corresponding to any of the methods summarized above. Further aspects may include a non-transitory processor-readable storage medium having stored thereon processor-executable instructions configured to cause a processor of a misbehavior management system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
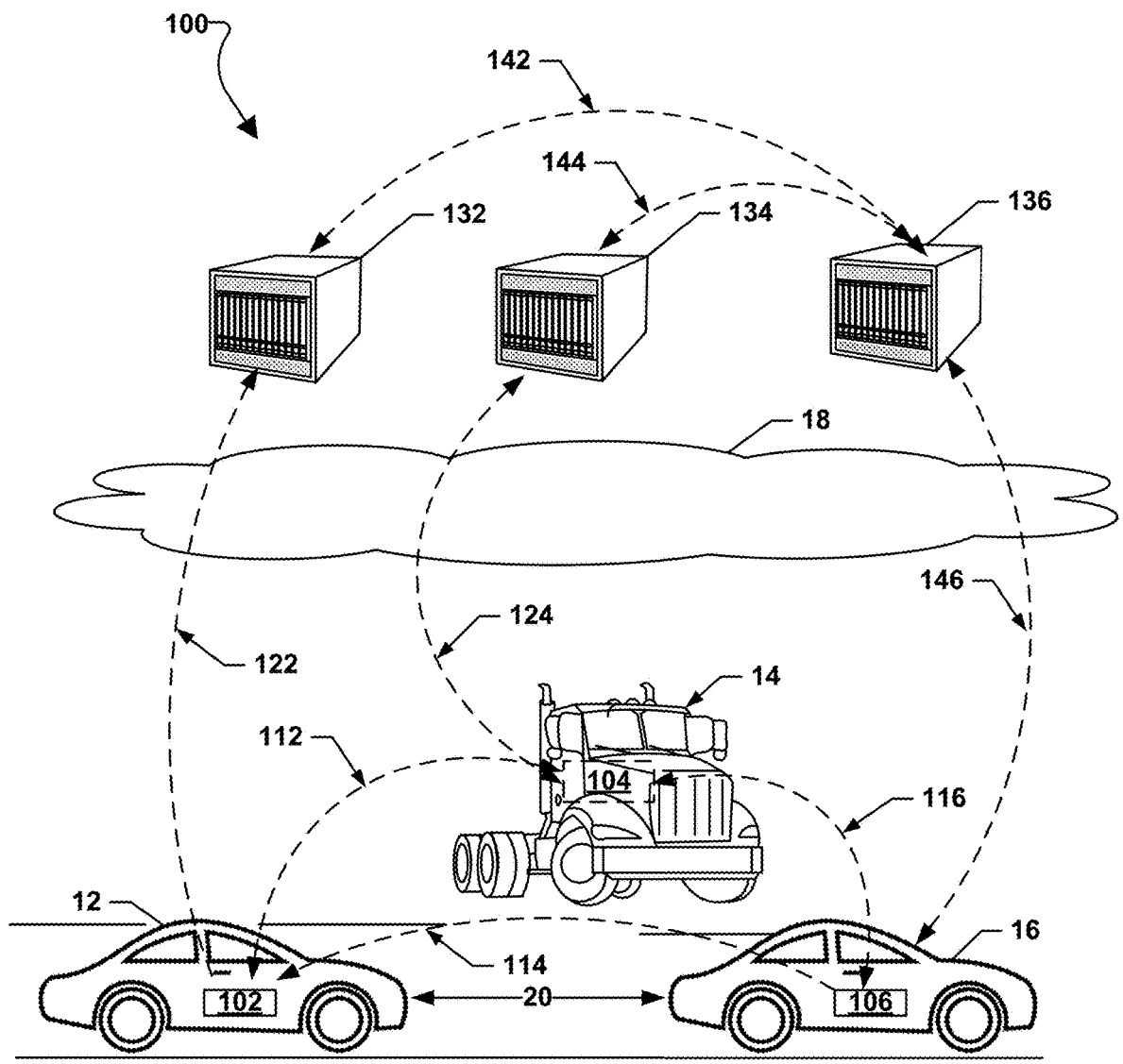
FIG. 1A is a schematic block diagram illustrating a subset of a V2X communication system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, various embodiments include methods and mechanisms for local management of misbehavior of an intelligent transportation system (ITS) station that is detected by V2X onboard equipment. Various embodiments enable a V2X processing device (e.g., of the V2X onboard equipment) to detect a misbehavior condition in a system of the vehicle, and prevent the V2X system from sending a V2X message related to the detected misbehavior condition in response to detecting the misbehavior condition in the system of the vehicle. Thus, various embodiments enable V2X onboard equipment to avoid transmitting V2X messages (e.g., Basic Safety Messages) that include in accurate or false information.

V2X systems and technologies hold great promise for improving traffic flows and vehicle safety by enabling vehicles to share information regarding their location, speed, direction of travel, braking, and other factors that may be useful to other vehicles for anti-collision and other safety functions. Vehicles equipped with V2X/V2V onboard equipment will frequently (e.g. up to 20 times per second) transmit their vehicle information in packets referred to as Basic Safety Messages (BSM) or Cooperative Awareness Message (CAM). With all V2X equipped vehicles transmitting such BSM/CAM messages, all receiving vehicles have the information required to control their own speed and direction to avoid collisions and efficiently and safely position vehicles with respect to each other. It is envisioned that V2X equipped vehicles may be able to improve traffic flow by safely reducing separation distances, platooning several vehicles together, and avoiding vehicles experiencing breakdowns.

In V2X communications, it is important that inaccurate, corrupted, or hacked (i.e., bad) data is detected in order to prevent such inaccurate data from further dissemination. However, as an increasing number of vehicles are equipped to participate in such networks, the volume of potential misbehavior condition data is large and growing at an exponential rate. Thus, the management of such detected misbehavior conditions may be controlled in order to effectively utilize V2X messaging. Current misbehavior detection systems rely on a device or vehicle receiving V2X signaling (i.e., a receiving device or vehicle) to detect misbehavior of a device or vehicle that transmits spurious or inaccurate V2X messages (i.e., a transmitting device or vehicle). Receiver-side techniques for such misbehavior detection, while crucially important, do not provide security for the remainder of the network (i.e., devices and vehicles other than the receiver device). Providing inaccurate V2X information, whether the result of malfunctioning equipment or an intentional attack, can place human health and safety at risk.

Various embodiments include methods and V2X processing devices configured to perform the methods for detecting misbehavior conditions within vehicle sensors or V2X systems, and managing V2X messages to avoid transmitting messages including unreliable information. In some embodiments, a V2X processing device (e.g., of V2X onboard equipment) of a vehicle may detect misbehavior on the vehicle (as opposed to detecting misbehavior of another vehicle or device), and perform an operation to protect other devices and vehicles from receiving inaccurate information due to own-device misbehavior. In some embodiments, the V2X processing device may detect a misbehavior condition in a system of the vehicle and, in response, prevent the vehicle from sending a V2X message related to the detected misbehavior condition, such as including inaccurate or compromised data. In some embodiments, the V2X processing device also may transmit to a management entity a misbehavior report indicating the detected misbehavior condition.

In some embodiments, the V2X processing device may receive information from a plurality of information sources of the vehicle, and detect the misbehavior condition in the system of the vehicle by performing a cross-check of information received from the plurality of information sources of the vehicle to detect an inconsistency within the received information. In some embodiments, V2X processing device may receive information from a variety of devices and systems, including an in-vehicle network, a vehicle sensor, a vehicle actuator, a radio frequency (RF) module, or a previously transmitted V2X message. Examples of an in-vehicle network include a Controller Area Network (CAN), a Local Interconnect Network (LIN), a network using the FlexRay protocol, a Media Oriented Systems Transport (MOST) network, and an Automotive Ethernet network. Examples of vehicles sensors include a location determining system (such as a Global Navigation Satellite Systems (GNSS) system, a camera, radar, lidar, ultrasonic sensors, infrared sensors, and other suitable sensor devices and systems. Examples of vehicle actuators include various physical control systems such as for steering, brakes, engine operation, lights, directional signals, and the like.

Previously transmitted V2X messages also may serve as a source of information for misbehavior detection, such as the informational content of a message, a target device or destination of the message, a rapidity or frequency at which multiple messages have been sent (e.g., an attempt to flood the network with messages), an amplitude at which a message has been sent (e.g., an attempt to jam a frequency or frequency band), and other suitable information from or about a previously transmitted V2X message.

In some embodiments, a misbehavior condition may be detected when a sensor or subsystem performing and failing a self-test procedure. Self-test procedures may be implemented as part of various sensors and subsystems, particularly safety-critical sensors and subsystems. Such sensors and subsystems may communicate a failed self-test condition to the processing devices, such as by setting a flag in a memory register or sending an interrupt signal.

In various embodiments, the V2X processing device may aggregate information from the plurality of sources in various manners. In various embodiments, the V2X processing device may generate and/or update a representation of the state of the various information sources. The state representation may be stored in a memory of the vehicle. In some embodiments, the V2X processing device may request or probe information from the plurality of sources (e.g., a "pull" process). In some embodiments, the V2X processing device may accept or receive information from the plurality of sources (e.g., a "push" process).

As noted above, the V2X processing device may detect the misbehavior condition in the system of the vehicle by performing a cross-check of information received from the plurality of information sources of the vehicle to detect an inconsistency within the received information. For example, the V2X processing device may use information from a global navigation satellite system (GNSS) sensor (e.g., a Global Positioning System (GPS) receiver) to verify position information to be sent in a V2X message. As another example, the V2X processing device may use information from a braking actuator and a CAN bus to validate information in a V2X message to be sent that indicates that the brake is being actuated. As another example, the V2X processing device may detect a flag or receive an interrupt indicating a failed self-test by a sensor or subsystem that provides information that could be included in a V2X message.

In an example of operations of various embodiments, a malicious actor that is able to compromise a vehicle's onboard unit (such as the unit responsible for V2X communication) could make changes to information representing the location of the vehicle from the actual position A(x, y) to a fake position B(x+100 m, y+100 m). In such a situation, the V2X processing device may receive position A from a GPS device, and the V2X processing device may identify the inconsistency between the location information from the GPS device and that in the onboard unit. The V2X processing device may detect this anomaly and, on that basis, prevent the inconsistent or inaccurate information from being sent in a V2X message to other vehicles or devices.

In some embodiments, the V2X processing device may identify a value that is received from a vehicle element and that is associated with the detected misbehavior condition. For example, the V2X processing device may identify a speed value, a direction value, a location value, a value indicating a state or operation of a vehicle system or actuator, and the like, that is associated with the detected misbehavior condition. In some embodiments, the V2X processing device may prevent the identified value from being used in a V2X message to be sent by the vehicle. For example, the V2X processing device may exclude the value associated with the misbehavior condition from the V2X message, and may send the V2X message without the excluded value.

In some embodiments, the V2X processing device may identify a vehicle element that is a source of the detected misbehavior condition, and may prevent information from the identified vehicle element from being used in a V2X message to be sent by the vehicle. In some embodiments, the vehicle element may be device or system, such as a telematics control unit (TCU) or onboard unit (OBU). In some embodiments, the vehicle element may be a V2X application or another application or service executing on a vehicle device or system. In some embodiments, the V2X processing device may add the identified vehicle element to a blocking list indicating that information from the identified vehicle element should not be used for generating V2X messages.

In some embodiments, the V2X processing device may perform an operation to correct the operation of a vehicle device or system associated with the detected misbehavior condition. For example, the V2X processing device may re-calibrate one or more sensors of the vehicle in response to detecting the misbehavior condition in the system of the vehicle.

In some embodiments, the V2X processing device may detect an inconsistency between an RF profile of the RF module and an RF module transmit configuration, and may prevent the vehicle from sending a V2X message using the RF module transmit configuration in response to detecting the misbehavior condition in the system of the vehicle. For example, the V2X processing device may be configured with one or more RF profiles (e.g., stored in memory) that indicate normal or expected operating parameters of the RF module. Normal or expected operating parameters may include, for example, a range of signal power in which the RF module typically transmits; a frequency range, frequency bands or frequency channels in which the RF module typically transmits; a typical transmit duration for transmitting a V2X message or a BSM; and other normal or expected operating parameters of the RF module. In some embodiments, prior to or during transmission of a V2X message, the V2X processing device may determine that the RF module is configured to transmit in a manner that is inconsistent with an RF profile of the RF module. For example, the V2X processing device may determine that the RF module is configured to transmit using a transmit power that is outside (e.g., greater than or less than) a transmit power range indicated in the RF profile. A mismatch or inconsistency between the RF profile and the RF module transmit configuration may result from surreptitious RF manipulation at the physical layer, or a faulty or malfunctioning device. In such instances, the V2X processing device may detect the inconsistency between the RF profile of the RF module and the RF module transmit configuration, and in response may prevent the vehicle from sending a V2X message using the RF module transmit configuration.

Various embodiments may improve the operations of a V2X processing system by enabling transmitter-side detection and mitigation of inaccurate or spurious information and preventing such information from being transmitted by the transmitting device. Various embodiments may improve the operations of a V2X network by improving the accuracy of information transmitted from a vehicle or other device. Various embodiments may improve the operations of a V2X system by detecting inaccurate or spurious information at the transmitting device, rather than at a receiving device, and preventing or mitigating the transmission of V2X messages including inaccurate or spurious information.

For ease of reference, some of the embodiments are described in this application with reference to a vehicle using vehicle-to-everything (V2X) systems and protocols. However, it should be understood that various embodiments encompass any or all of the V2X or vehicle-based communication standards, messages or technologies. As such, nothing in the application should be construed to limit the claims to V2X and Basic Safety Message (BSM) unless expressly recited as such in the claims. In addition, the embodiments described herein may refer to a V2X processing system in a vehicle. Other embodiments are contemplated in which the V2X processing system may operate in or be included in mobile devices, mobile computers, road side units (RSU), and other devices that are equipped to monitor road and vehicle conditions and to participate in V2X communications.

Figure 1B:
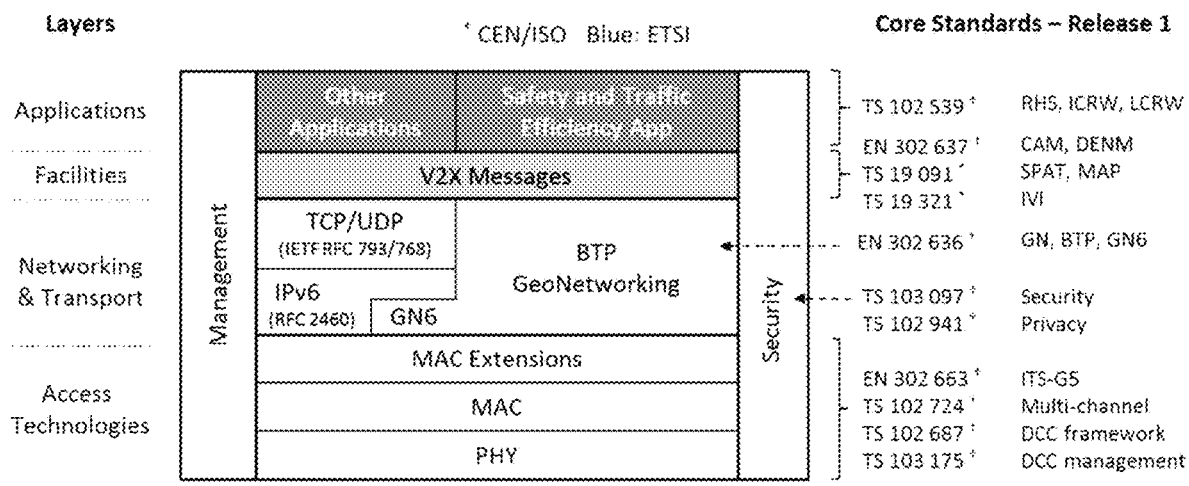
FIG. 1B is a schematic block diagram illustrating a V2X communication protocol stack suitable for implementing various embodiments.

To aid in describing the problem addressed by various embodiments, FIG. 1A illustrates a portion of the V2X system 100 including three vehicles, 12, 14, 16. FIG. 1B illustrates an example V2X communication protocol stack 150 suitable for implementing various embodiments. With reference to FIGS. 1A and 1B, each vehicle 12, 14, 16 includes V2X onboard equipment 102, 104, 106, respectively, that are configured to periodically broadcast Basic Safety Messages 112, 114, 116 for receipt and processing by other vehicles' onboard equipment (e.g., 102, 104, 106).

By sharing the vehicle location, speed, direction, braking, and other information, vehicles can maintain safe separation and identify and avoid potential collisions. For example, a trailing vehicle 12 receiving Basic Safety Messages 114 from a leading vehicle 16 can determine the speed and location of the vehicle 16, enabling vehicle 12 to match the speed and maintain a safe separation distance 20. By being informed through Basic Safety Messages 114 when the leading vehicles 16 applies the brakes, the V2X equipment 102 in the trailing vehicle 12 can apply brakes simultaneously to maintain the safe separation distance 20 even when the leading vehicle 16 stopped suddenly. As another example, the V2X equipment 104 within the truck vehicle 14 may receive Basic Safety Messages 112, 116 from the two vehicles 12, 16, and thus be informed that the truck vehicle 14 should stop at the intersection to avoid a collision.

Each of the vehicle V2X on-board equipment 102, 104, 106 may communicate with one another using any of a variety close proximity communication protocols. In addition, the vehicles may be able to transmit data and information regarding detected Basic Safety Messages as well as detected misbehavior reports (MBR) to an original equipment manufacturer (OEM) (132, 134) and/or remote misbehavior managing authority 136 via communication links 122, 124 through a communication network 18 (e.g., cellular. WiFi, etc.) The MBRs may be transmitted directly to the misbehavior managing authority 136 (e.g., through communication link 146). The MBR may first be transmitted to a MBR pre-processing unit such as the OEM servers 132, 134 for pre-processing through communication links 122, 124. Then the pre-processed MBR may be transmitted from the MBR pre-processing 132, 134 to the misbehavior managing authority 136 through communication links 142, 144.

Given the criticality of Basic Safety Messages to the safe operation of surrounding vehicles, care should be taken to ensure that Basic Safety Messages are accurate and can be relied upon by other vehicles. One measure used to ensure reliability involves issuing certificates to each V2X onboard equipment that can be used to sign Basic Safety Messages. The certificate issued to V2X onboard equipment does not include a persistent identity for the V2X onboard equipment, and for this reason is typically referred to as a Pseudonym Certificate. A Misbehavior Management System operating within the V2X onboard equipment in nearby vehicles and highway monitoring systems of a basic safety podcast can confirm the authenticity of the V2X onboard equipment issuing the Basic Safety Message by verifying the signature on the broadcast messages. V2X onboard equipment receiving a Basic Safety Message can verify the signature using a public key. To guard against hacking or interference with the V2X system operations, V2X onboard equipment may be configured to ignore any received Basic Safety Message that has been signed using an expired or invalid certificate.

While signing Basic Safety Messages using the certificate issued to V2X onboard equipment guards against attempts to inject false Basic Safety Messages, the signature verification process may not detect when inaccurate Basic Safety Messages are generated by malfunctioning V2X onboard equipment using a legitimate certificate. Various equipment malfunctions may cause a V2X onboard equipment to produce incorrect Basic Safety Messages. For example, faults in navigation sensors, speed sensors, and/or cabling from such sensors to the V2X onboard equipment may result in inaccurate reporting of vehicle position (e.g., in an incorrect lane or larger error) or speed. It is also possible that a V2X onboard equipment may be maliciously altered to produce incorrect Basic Safety Messages that are signed using a legitimate certificate. Both cases are referred to as misbehavior.

In many cases, a receiving Misbehavior Management System may detect the misbehavior via misbehavior detection in onboard processing. Incorrect Basic Safety Messages may be recognized by the Misbehavior Management System operating in other vehicles when information contained in such messages conflicts with trustworthy information available to the V2X onboard equipment. For example, a Misbehavior Management System may recognize that the position information in a received Basic Safety Message is incorrect when the reported location of the reporting vehicle overlaps with the position of the vehicle receiving the Basic Safety Message. As another example, a Misbehavior Management System may recognize that the velocity information in received Basic Safety Message is incorrect when the velocity is inconsistent with the velocity of the equipment's own vehicle and surrounding vehicles. Other methods of recognizing incorrect Basic Safety Messages may be used.

To ensure the integrity and reliability of the V2X systems, the Misbehavior Management System may be configured to inform other vehicles and highway systems or authorities of detected incorrect Basic Safety Messages by transmitting messages that notify other systems of the detected issues. In conventional systems, the receiving V2X onboard equipment may automatically produce a misbehavior report (MBR in the figures) or Misbehavior Detection Report. Each MBR may include the Pseudonym Certificate of the misbehaving V2X onboard equipment that signed the incorrect Basic Safety Message. A Misbehavior Management System that detected the misbehavior may be configured to send the Misbehavior Detection Report to a specific network backend entity for processing, which is referred to herein as the Misbehavior Authority (MA) of a Security Credential Management System (SCMS). The reporting V2X onboard equipment is typically configured by the OEM, so the Misbehavior Report Catcher is typically operated by, or on behalf of, the OEM of the reporting V2X onboard equipment.

Misbehavior detection reports may be collected by a misbehavior authority, which may be an entity run by any of a variety of parties, such as a government agency, an independent third-party agency or service provider, and/or an OEM. A misbehavior authority may be configured to take actions to protect the reliability and integrity of the V2X systems and equipment. For example, a misbehavior authority may blacklist the certificates of misbehaving V2X onboard equipment so that other V2X onboard equipment can know to ignore Basic Safety Messages containing blacklisted certificates. Decentralized misbehavior authorities may also inform certificate registration authorities of certificates so that appropriate actions can be taken by the corresponding Registration Authority.

In V2X communication, it is beneficial to detect bad data to prevent the spread of useless data among vehicles. The term misbehaving V2X onboard equipment is used herein to refer to a sensor or system that is generating inaccurate or false data, or otherwise generating information which could be misleading if transmitted in a V2X message. In some cases another component or entity, and not the attributed V2X onboard equipment, could be misbehaving using messages or credentials obtained from the V2X onboard equipment. For example, a faulty sensor or equipment in the vehicle may be the cause of erroneous information that the V2X would otherwise include in a Basic Safety Message.

The sending V2X equipment (e.g., TCU, OBU, RSU, ASD, etc.) may detect misbehavior conditions and take actions to prevent compromised or inaccurate information from being included in V2X messages. Various embodiment Misbehavior Management Systems may be deployed on any device capable of transmitting V2X messages. Thus, various embodiments disclosed herein may work in an onboard unit mounted within a vehicle, in a smartphone, roadside unit, or even in the cloud, to name a few.

Figure 2:
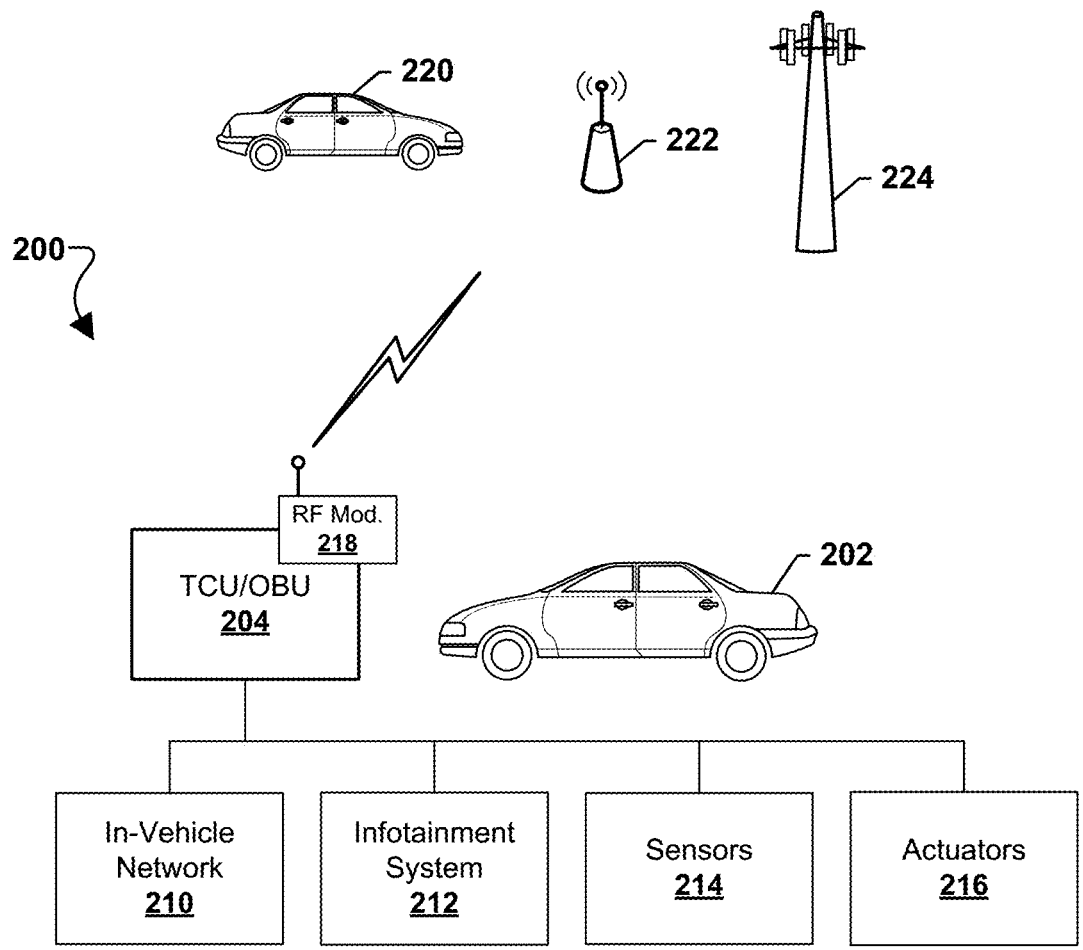
FIG. 2 is a component diagram of an example system for misbehavior condition management in a V2X communication system in accordance with various embodiments.

FIG. 2 is a component diagram of an example system 200 for misbehavior condition management. With reference to FIGS. 1A-2, the system 200 may include a vehicle 202 that includes a V2X processing device 204 (for example, a telematics control unit or on-board unit (TCU/OBU)) The V2X processing device 204 may communicate with various systems and devices, such as an in-vehicle network 210, an infotainment system 212, various sensors 214, various actuators 216, and an RF module 218. The V2X processing device 204 also may communicate with various other vehicles 220, roadside units 222, base stations 224, and other external devices. The V2X processing device 204 (e.g., TCU/OBU) may be configured to perform operations of a local misbehavior prevention system, a local misbehavior detection system, and a local misbehavior reporting system, all of which may be instantiated or performed by hardware, software, or a combination of hardware and software (for example, by components illustrated in FIG. 4, 5, or 6)

The V2X processing device 202 may include a V2X antenna, and may be configured to communicate with one or more ITS stations such as another vehicle 220, a roadside unit 222, and a base station 224 or another suitable network access point. In various embodiments, the V2X processing device 202 may receive information from a plurality of information sources, such as the in-vehicle network 210, infotainment system 212, various sensors 214, various actuators 216, and an RF module 218. The V2X processing device 202 may detect a misbehavior condition in a system of the vehicle, such as one of the plurality of information sources 210-218, an application or service executing on the V2X processing device 202, or another system of the vehicle. In some embodiments, the V2X processing device 202 may detect the misbehavior condition in the system of the vehicle by performing a cross-check of information received from the plurality of information sources of the vehicle to detect an inconsistency within the received information, as further described below.

Figure 3A:
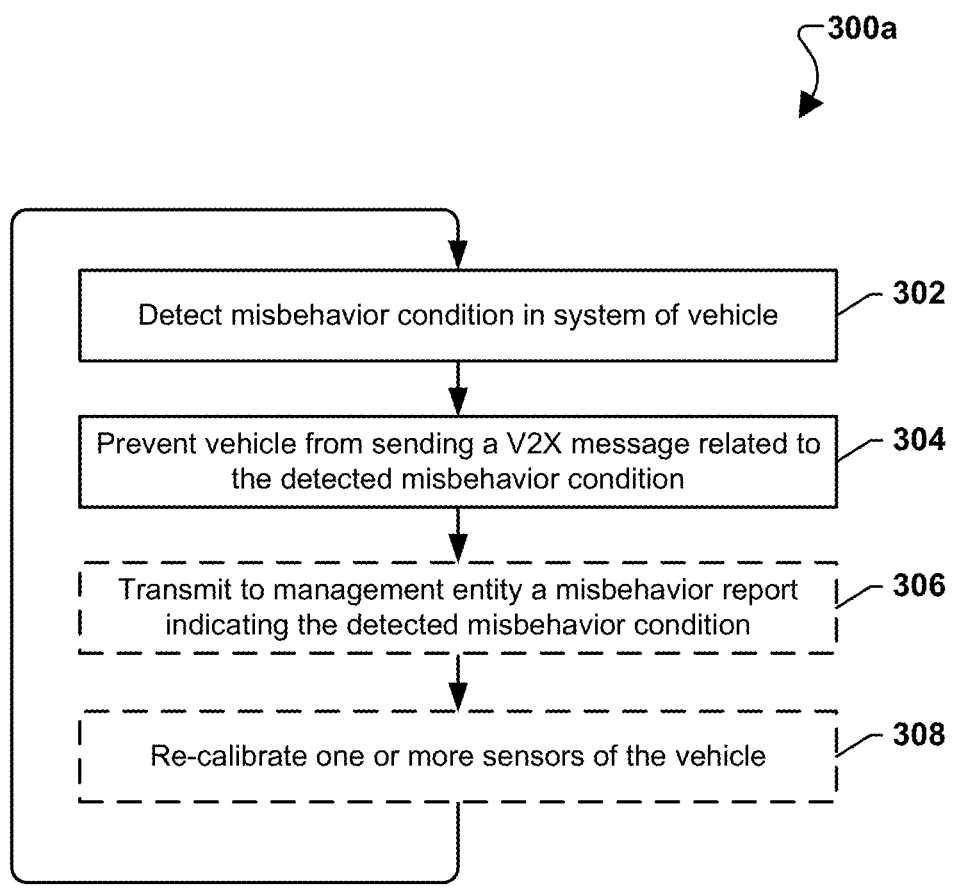
FIG. 3A is a process flow diagram of a method for misbehavior condition management in a V2X communication system in accordance with various embodiments.

FIG. 3A is a process flow diagram of an example method 300a for misbehavior condition management in accordance with various embodiments. With reference to FIGS. 1-3A, the operations of the method 300a may be performed by a vehicle-to-everything (V2X) processing device (such as the V2X processing device 204, FIG. 2) the that includes hardware, software, or a combination of hardware and software components, such as those illustrated in FIGS. 2, 4, 12, and 13. For example, means for performing the operations of the method 300a may include a vehicle-to-everything (V2X) processing device (such as the V2X processing device 204, the in-vehicle network 210, an infotainment system 212, various sensors 214, various actuators 216, and an RF module 218 (FIG. 2).

In block 302, the V2X processing device may detect a misbehavior condition in a system of the vehicle. As described, this detection may be accomplished by comparing various sensor and operating parameter values to other related values and/or acceptable ranges of such values, and detect a misbehavior condition in response to an inconsistency or conflict among such values. As another example, a misbehavior condition may be detected when a sensor or subsystem performing and failing a self-test procedure.

In block 304, the V2X processing device may detect prevent the vehicle from sending a V2X message related to the detected misbehavior condition in response to detecting the misbehavior condition in the system of the vehicle. For example, the processing device may determine that a message triggered by the detected misbehavior condition should not be generated or transmitted. As another example, the processing device may omit information associated with or generated by the detected misbehavior condition from a Basic Safety Message. For example, if the detected misbehavior condition involves a vehicle speed (e.g., the detected misbehavior condition is an inaccurate speedometer), the V2X processing device may generate a Basic Safety Message including other information but indicate a null value or "unavailable" in a data field assigned to vehicle speed.

In optional block 306, the V2X processing device may transmit to a management entity a misbehavior report indicating the detected misbehavior condition.

In optional block 308, the V2X processing device may re-calibrate one or more sensors of the vehicle in response to detecting the misbehavior condition in the system of the vehicle. In some embodiments, the V2X processing device may perform another operation to correct the operation of a vehicle device or system associated with the detected misbehavior condition.

The V2X processing device may iteratively perform the operations of blocks 302 and 304 and optional blocks 306 and 308 from time to time. In this manner, the V2X processing device may detect when a sensor and/or subsystem begins to exhibit misbehavior.

FIGS. 3B-3E are process flow diagrams of example operations 300b-300e that may be performed as part of the method 300a for misbehavior condition management in accordance with various embodiments. With reference to FIGS. 1-3D, the operations 300b-300d may be performed by a vehicle-to-everything (V2X) processing device (such as the V2X processing device 204, FIG. 2) the that includes hardware, software, or a combination of hardware and software components, such as those illustrated in FIGS. 2, 4, 12, and 13. For example, means for performing the operations 300b-300e may include the vehicle-to-everything (V2X) processing device (such as the V2X processing device 204, the in-vehicle network 210, an infotainment system 212, various sensors 214, various actuators 216, and an RF module 218 (FIG. 2).

Figure 3B:
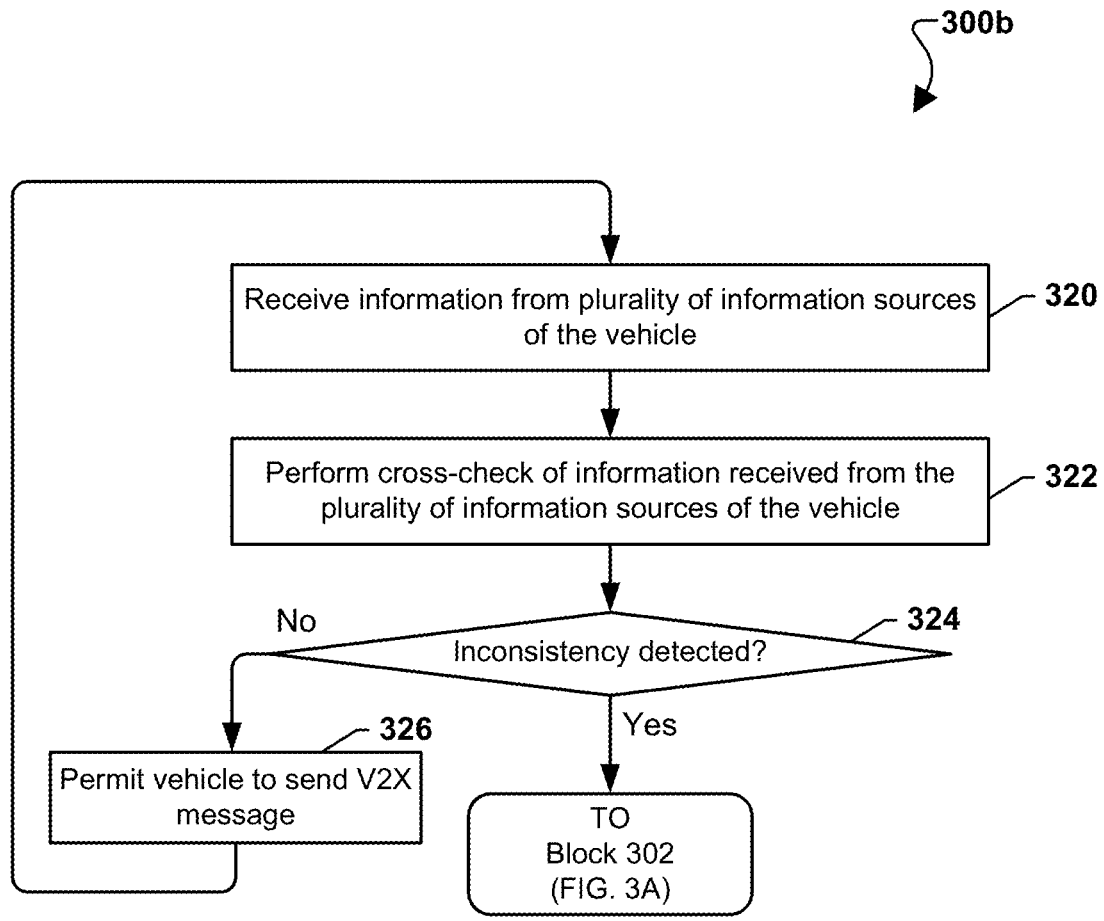
FIGS. 3B-3E are process flow diagrams of operations that may be performed as part of the method for misbehavior condition management in accordance with various embodiments.

With reference to FIG. 3B, the V2X processing device may receive information from a plurality of information sources of the vehicle in block 320. In some embodiments, the plurality of information sources of the vehicle may include one or more of an in-vehicle network (e.g., 210, 212), a vehicle sensor (e.g., 214), a vehicle actuator (e.g., 214), or a previously transmitted V2X message (which may be stored in a memory of the V2X processing device 204).

In block 322, the V2X processing device may perform a cross-check of information received from the plurality of information sources of the vehicle to detect an inconsistency within the received information.

In determination block 324, the V2X processing device may determine whether an inconsistence is detected within the received information.

In response to determining that an inconsistency is not detected (i.e., determination block 324="No"), the processor may permit the vehicle to send the V2X message in block 326. The processor may the V2X processing device may detect a misbehavior condition in block 320 as described.

In response to determining that an inconsistency is detected (i.e., determination block 324="Yes"), the V2X processing device may perform the operations of block 302 as described.

Figure 3C:
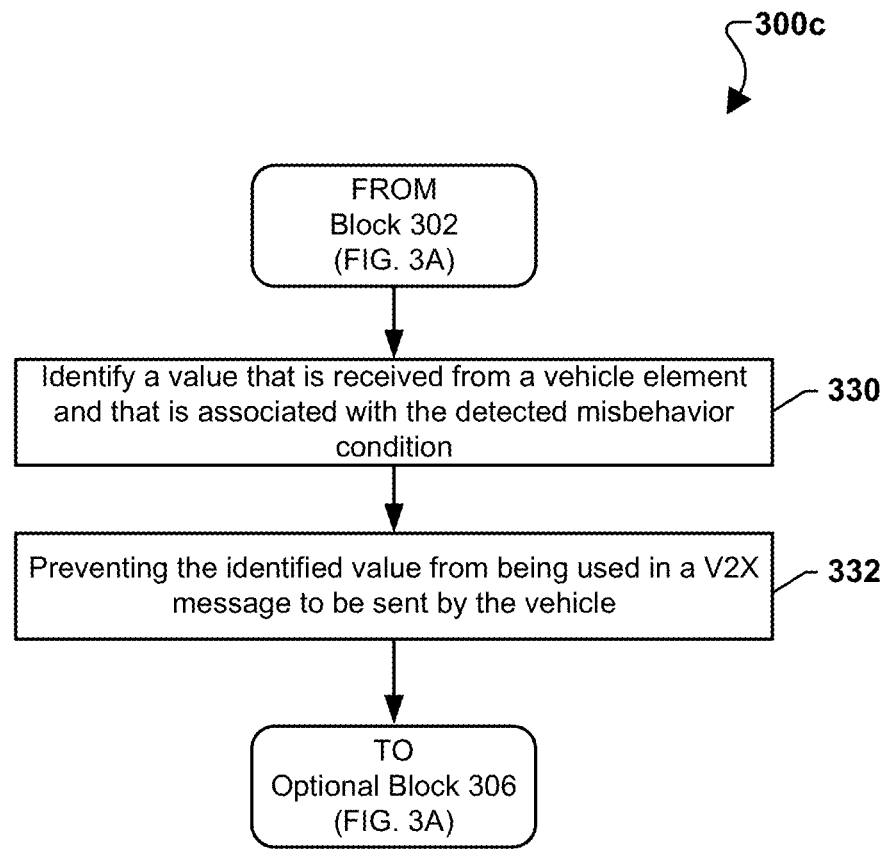

With reference to FIG. 3C, following the performance of the operations of block 302 (FIG. 3A), the V2X processing device may identify a value that is received from a vehicle element and that is associated with the detected misbehavior condition in block 330.

In block 332, the V2X processing device may prevent the identified value from being used in a V2X message to be sent by the vehicle. For example, the identified value may be replaced with a null value or an unavailable indication in a transmitted message.

The V2X processing device may then perform the operations of optional block 306 (FIG. 3A) as described.

Figure 3D:
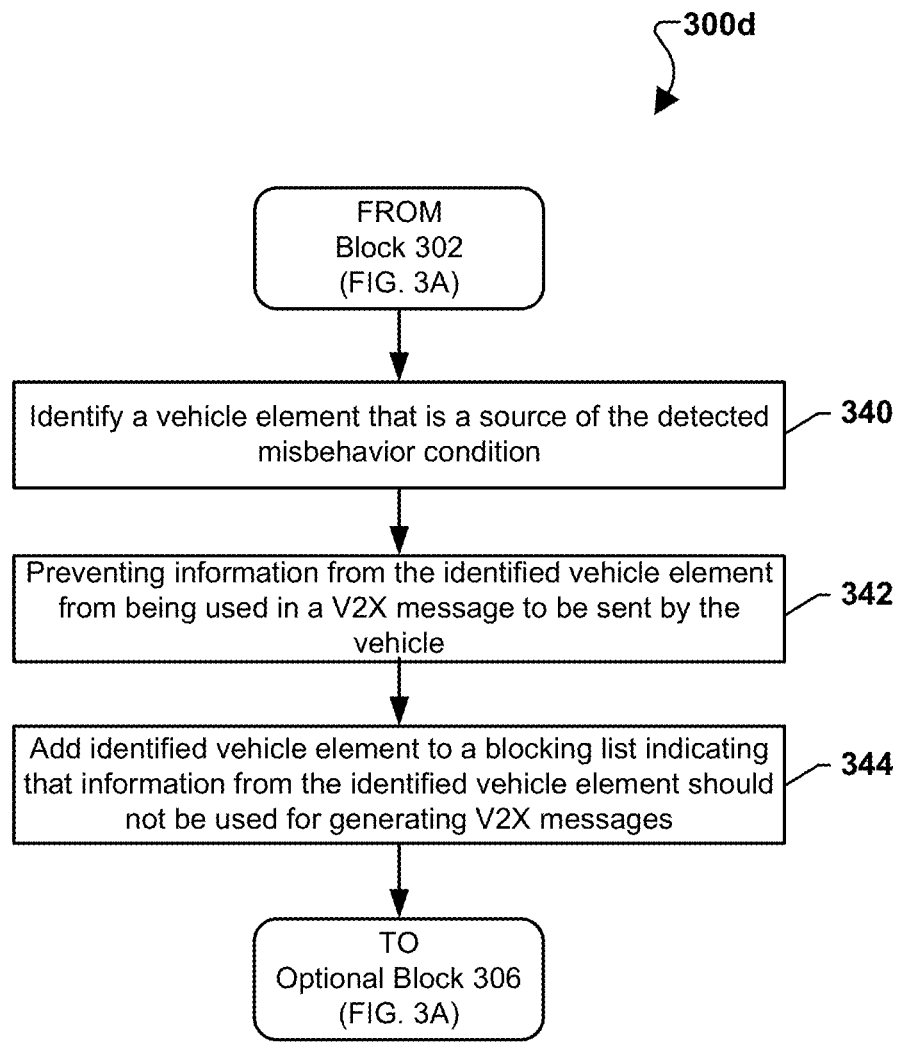

With reference to FIG. 3D, following performance of the operations of block 302 of the method 300a (FIG. 3A), the V2X processing device may identify a vehicle element that is a source of the detected misbehavior condition in block 340.

In block 342, the V2X processing device may prevent information from the identified vehicle element from being used in a V2X message to be sent by the vehicle. For example, the processing device may determine that a message triggered by the detected misbehavior condition should not be generated or transmitted, or may omit information associated with or generated by the detected misbehavior condition from a Basic Safety Message.

In block 344, the V2X processing device may add the identified vehicle element to a blocking list indicating that information from the identified vehicle element should not be used for generating V2X messages. This identifier vehicle element may inform V2X receiving devices and/or a central authority, such as a monitoring authority, of the sensor or subsystem that is misbehaving.

The V2X processing device may transmit an MBR to a management entity in optional block 306 as described.

Figure 3E:
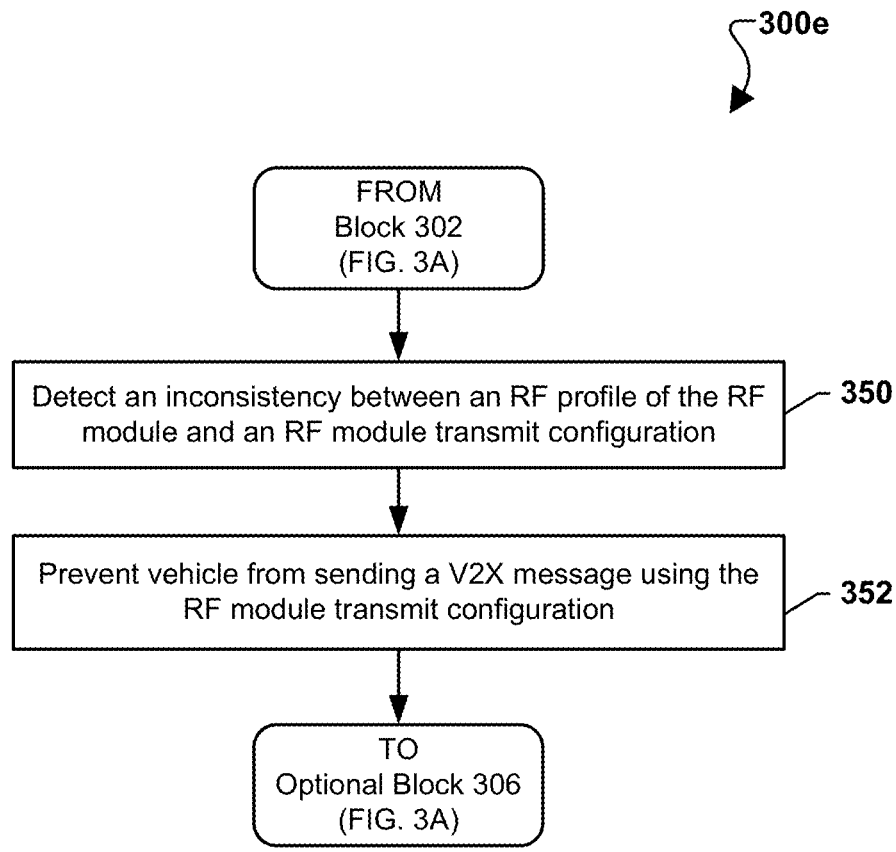

With reference to FIG. 3E, following the performance of the operations of block 302 (FIG. 3A), the V2X processing device may detect an inconsistency between an RF profile of the RF module and an RF module transmit configuration in block 350. As described, such an inconsistency may be the RF module transmitting at a power greater than or less than a preset operating range.

In block 352, the V2X processing device may prevent the vehicle from sending a V2X message using the RF module transmit configuration.

The V2X processing device may then perform the operations of optional block 306 (FIG. 3A) as described.

Figure 4:
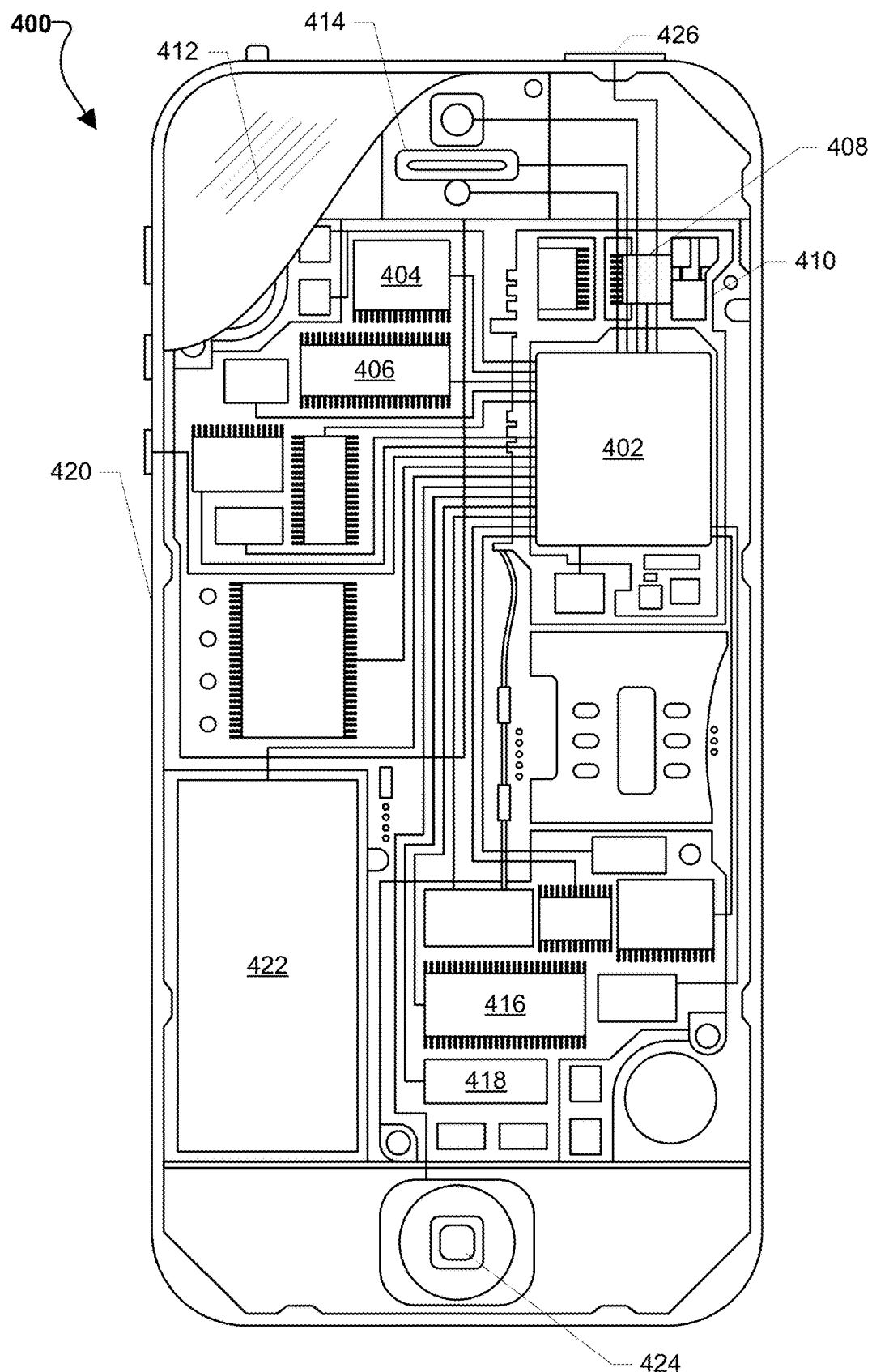
FIG. 4 is a component block diagram illustrating an example mobile computing device suitable for use with various embodiments.

Various embodiments (including, but not limited to, embodiments described above with reference to FIGS. 1-3E) may be implemented in a wide variety of computing systems including on-board equipment as well as mobile computing devices, an example of which suitable for use with various embodiments is illustrated in FIG. 4. The mobile computing device 400 may include a processor 402 coupled to a touchscreen controller 404 and an internal memory 406. The processor 402 may be one or more multicore integrated circuits designated for general or specific processing tasks. The internal memory 406 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 404 and the processor 402 may also be coupled to a touchscreen panel 412, such as a resistive-sensing touchscreen, capacitive-sensing touchscreen, infrared sensing touchscreen, etc. Additionally, the display of the mobile computing device 400 need not have touch screen capability.

The mobile computing device 400 may have one or more radio signal transceivers 408 (e.g., Peanut, Bluetooth, Zig-Bee, Wi-Fi, RF radio) and antennae 410, for sending and receiving communications, coupled to each other and/or to the processor 402. The transceivers 408 and antennae 410 may be used with the above-mentioned circuitry to implement the various wireless transmission protocol stacks and interfaces. The mobile computing device 400 may include a cellular network wireless modem chip 416 that enables communication via a cellular network and is coupled to the processor.

The mobile computing device 400 may include a peripheral device connection interface 418 coupled to the processor 402. The peripheral device connection interface 418 may be singularly configured to accept one type of connection, or may be configured to accept various types of physical and communication connections, common or proprietary, such as Universal Serial Bus (USB), FireWire, Thunderbolt, or PCIe. The peripheral device connection interface 418 may also be coupled to a similarly configured peripheral device connection port (not shown).

The mobile computing device 400 may also include speakers 414 for providing audio outputs. The mobile computing device 400 may also include a housing 420, constructed of a plastic, metal, or a combination of materials, for containing all or some of the components described herein. One of ordinary skill in the art may recognize that the housing 420 may be a dashboard counsel of a vehicle in an on-board embodiment. The mobile computing device 400 may include a power source 422 coupled to the processor 402, such as a disposable or rechargeable battery. The rechargeable battery may also be coupled to the peripheral device connection port to receive a charging current from a source external to the mobile computing device 400. The mobile computing device 400 may also include a physical button 424 for receiving user inputs. The mobile computing device 400 may also include a power button 426 for turning the mobile computing device 400 on and off.

Figure 5:
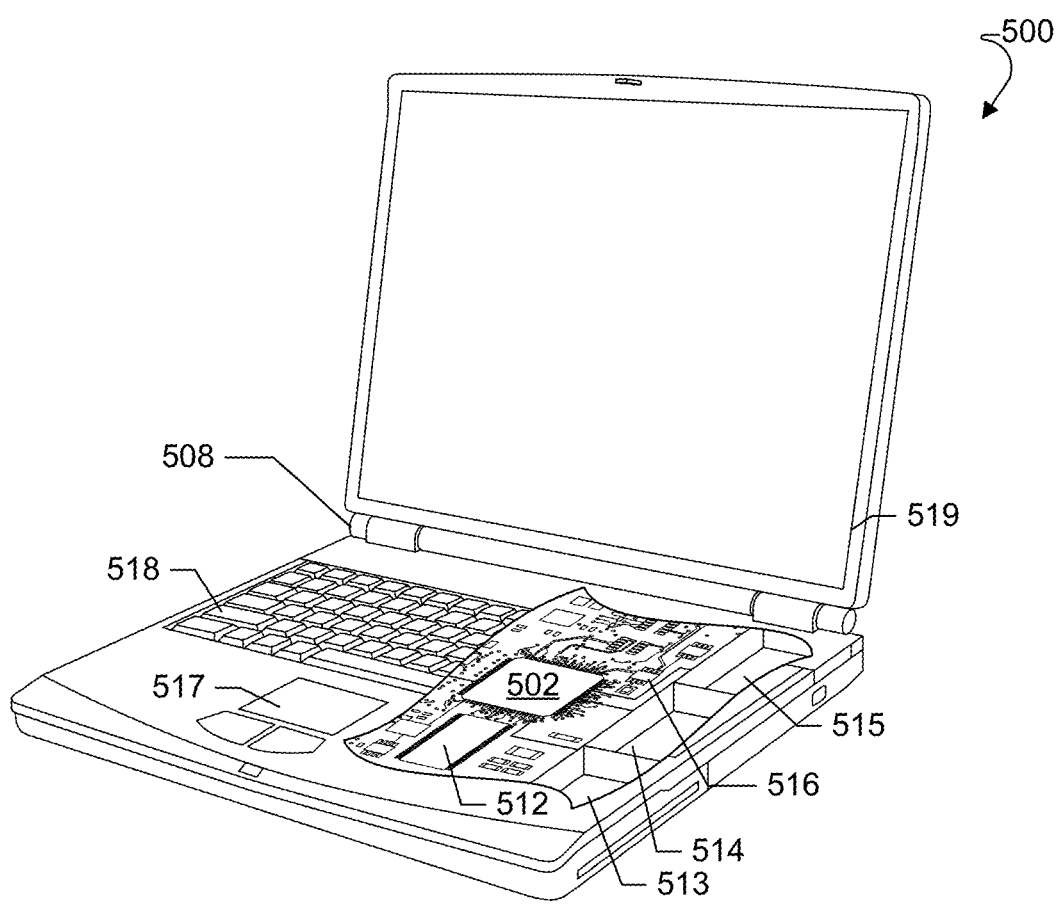
FIG. 5 is a component block diagram illustrating an example mobile computing device suitable for use with various embodiments.

Various embodiments (including, but not limited to, embodiments described above with reference to FIGS. 1-3E) may be implemented in a wide variety of computing systems include a laptop computer 500 an example of which is illustrated in FIG. 5. Many laptop computers include a touchpad touch surface 517 that serves as the computer's pointing device, and thus may receive drag, scroll, and flick gestures similar to those implemented on computing devices equipped with a touch screen display and described above. A laptop computer 500 will typically include a processor 502 coupled to volatile memory 512 and a large capacity nonvolatile memory, such as a disk drive 513 of Flash memory. Additionally, the computer 500 may have one or more antenna 508 for sending and receiving electromagnetic radiation that may be connected to a wireless data link and/or cellular telephone transceiver 516 coupled to the processor 502. The computer 500 may also include a floppy disc drive 514 and a compact disc (CD) drive 515 coupled to the processor 502. In a notebook configuration, the computer housing includes the touchpad 517, the keyboard 518, and the display 519 all coupled to the processor 502. Other configurations of the computing device may include a computer mouse or trackball coupled to the processor (e.g., via a USB input) as are well known, which may also be used in conjunction with various embodiments.

Figure 6:
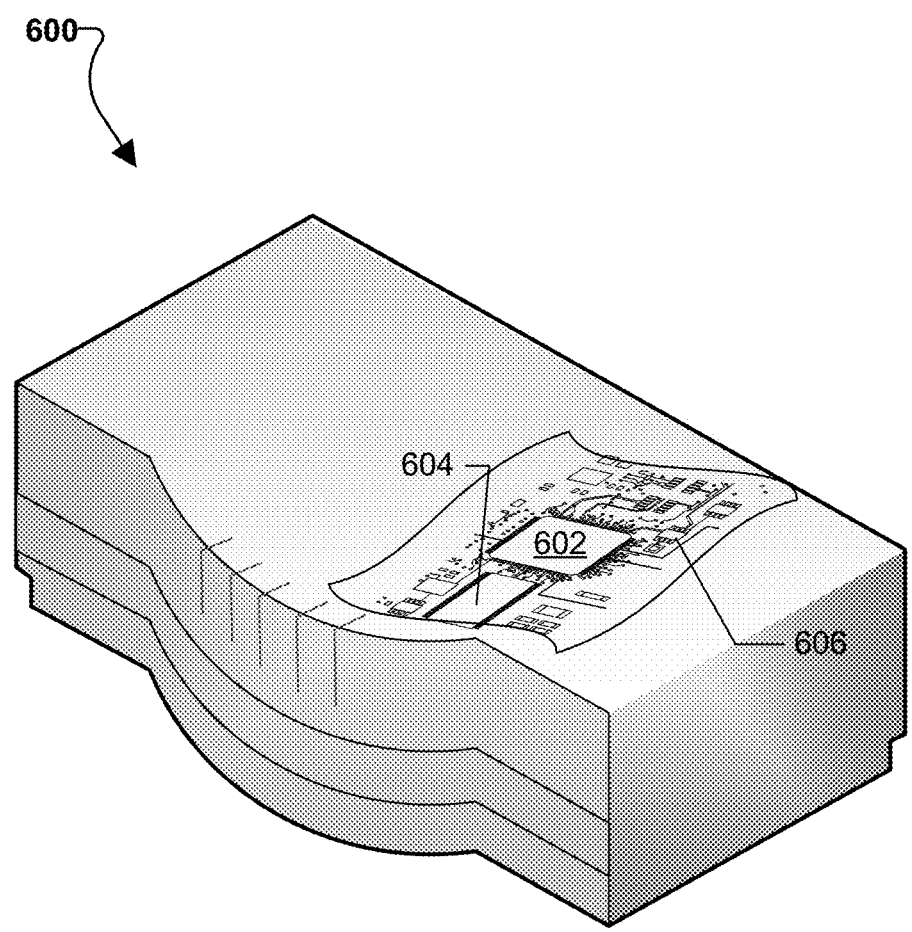
FIG. 6 is a component block diagram illustrating an example V2X onboard equipment for use with various embodiments.

Various embodiments (including, but not limited to, embodiment methods described with reference to FIGS. 3A-3E) may be implemented in a wide variety of V2X onboard systems, an example of which is illustrated in FIG. 6. Such onboard equipment 600 may be configured to be implemented in a vehicle and connect to various vehicles systems and sensors. The onboard equipment 600 may include a processor 602 coupled to memory 604. The memory 604 may be any form of non-transitory media (e.g., read only memory (ROM), FLASH memory, etc.) and may store data and processor-executable instructions configured to cause the processor 602 to perform operations of any of the embodiment methods described herein. The processor 602 may also be coupled to a wireless transceiver 606 that is coupled to an antenna of the vehicle (not shown) and configured to transmit and receive V2X messages.

Implementation examples are described in the following paragraphs. While some of the following implementation examples are described in terms of example methods, further example implementations may include: the example methods discussed in the following paragraphs implemented by a V2X processing device that may be an on-board unit, mobile device unit, mobile computing unit, or stationary roadside unit including a processor configured with processor-executable instructions to perform operations of the methods of the following implementation examples; the example methods discussed in the following paragraphs implemented by a V2X processing device including means for performing functions of the methods of the following implementation examples; and the example methods discussed in the following paragraphs may be implemented as a non-transitory processor-readable storage medium having stored thereon processor-executable instructions configured to cause a processor of a V2X processing device to perform the operations of the methods of the following implementation examples.

Example 1. A method of misbehavior condition management performed by a vehicle-to-everything (V2X) processing device of a vehicle, including detecting a misbehavior condition in a system of the vehicle, and preventing the vehicle from sending a V2X message related to the detected misbehavior condition in response to detecting the misbehavior condition in the system of the vehicle.

Example 2. The method of example 1, further including transmitting to a management entity a misbehavior report indicating the detected misbehavior condition in response to detecting the misbehavior condition in the system of the vehicle.

Example 3. The method of either of examples 1 or 2, in which detecting a misbehavior condition in a system of the vehicle includes receiving information from a plurality of information sources of the vehicle, and detecting the misbehavior condition in the system of the vehicle by performing a cross-check of information received from the plurality of information sources of the vehicle to detect an inconsistency within the received information.

Example 4. The method of any of examples 1-3, in which the plurality of information sources of the vehicle includes one or more of an in-vehicle network, a vehicle sensor, a vehicle actuator, or a previously transmitted V2X message.

Example 5. The method of any of examples 1-4, in which preventing the vehicle from sending a V2X message related to the detected misbehavior condition in response to detecting the misbehavior condition in the system of the vehicle includes identifying a value that is received from a vehicle element and that is associated with the detected misbehavior condition, and preventing the identified value from being used in a V2X message to be sent by the vehicle.

Example 6. The method of any of examples 1-5, in which preventing the vehicle from sending a V2X message related to the detected misbehavior condition in response to detecting the misbehavior condition in the system of the vehicle includes identifying a vehicle element that is a source of the detected misbehavior condition, and preventing information from the identified vehicle element from being used in a V2X message to be sent by the vehicle.

Example 7. The method of example 6, further including adding the identified vehicle element to a blocking list indicating that information from the identified vehicle element should not be used for generating V2X messages.

Example 8. The method of claim 1, in which detecting a misbehavior condition in a system of the vehicle includes detecting an inconsistency between an RF profile of the RF module and an RF module transmit configuration, and preventing the vehicle from sending a V2X message related to the detected misbehavior condition in response to detecting the misbehavior condition in the system of the vehicle includes preventing the vehicle from sending a V2X message using the RF module transmit configuration.

Example 9. The method of any of examples 1-8, further including re-calibrating one or more sensors of the vehicle in response to detecting the misbehavior condition in the system of the vehicle.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of misbehavior condition management performed by a vehicle-to-everything (V2X) processing device of a vehicle, comprising:
    detecting a misbehavior condition of a system of the vehicle; and
    preventing the vehicle from sending a V2X message related to the detected misbehavior condition in response to detecting the misbehavior condition of the system of the vehicle.

2. The method of claim 1, further comprising transmitting to a management entity a misbehavior report indicating the detected misbehavior condition in response to detecting the misbehavior condition of the system of the vehicle.

3. The method of claim 1, wherein detecting a misbehavior condition of a system of the vehicle comprises:
    receiving information from a plurality of information sources of the vehicle; and
    detecting the misbehavior condition of the system of the vehicle by performing a cross-check of information received from the plurality of information sources of the vehicle to detect an inconsistency within the received information.

4. The method of claim 3, wherein the plurality of information sources of the vehicle comprises one or more of an in-vehicle network, a vehicle sensor, a vehicle actuator, radio frequency (RF) module, or a previously transmitted V2X message.

5. The method of claim 1, wherein preventing the vehicle from sending the V2X message related to the detected misbehavior condition in response to detecting the misbehavior condition of the system of the vehicle comprises:
    identifying a value that is received from a vehicle element and that is associated with the detected misbehavior condition; and
    preventing the identified value from being used in a V2X message to be sent by the vehicle.

6. The method of claim 1, wherein preventing the vehicle from sending the V2X message related to the detected misbehavior condition in response to detecting the misbehavior condition of the system of the vehicle comprises:
    identifying a vehicle element that is a source of the detected misbehavior condition; and
    preventing information from the identified vehicle element from being used in a V2X message to be sent by the vehicle.

7. The method of claim 6, further comprising:
adding the identified vehicle element to a blocking list indicating that information from the identified vehicle element should not be used for generating V2X messages.

8. The method of claim 1, wherein:
detecting a misbehavior condition of a system of the vehicle comprises detecting an inconsistency between a radio frequency (RF) profile of an RF module and an RF module transmit configuration; and
preventing the vehicle from sending the V2X message related to the detected misbehavior condition in response to detecting the misbehavior condition of the system of the vehicle comprises preventing the vehicle from sending the V2X message using the RF module transmit configuration.

9. The method of claim 1, further comprising re-calibrating one or more sensors of the vehicle in response to detecting the misbehavior condition of the system of the vehicle.

10. A vehicle-to-everything (V2X) processing device, comprising:
a processor configured with processor-executable instructions to:
detect a misbehavior condition of a system of a vehicle; and
prevent sending a V2X message related to the detected misbehavior condition in response to detecting the misbehavior condition of the system of the vehicle.

11. The V2X processing device of claim 10, wherein the processor is further configured with processor-executable instructions to transmit to a management entity a misbehavior report indicating the detected misbehavior condition in response to detecting the misbehavior condition of the system of the vehicle.

12. The V2X processing device of claim 10, wherein the processor is further configured with processor-executable instructions to detect a misbehavior condition of a system of the vehicle by:
receiving information from a plurality of information sources of the vehicle; and
detecting the misbehavior condition of the system of the vehicle by performing a cross-check of information received from the plurality of information sources of the vehicle to detect an inconsistency within the received information.

13. The V2X processing device of claim 12, wherein the plurality of information sources of the vehicle comprises one or more of an in-vehicle network, a vehicle sensor, a vehicle actuator, radio frequency (RF) module, or a previously transmitted V2X message.

14. The V2X processing device of claim 10, wherein the processor is further configured with processor-executable instructions to prevent sending the V2X message related to the detected misbehavior condition in response to detecting the misbehavior condition of the system of the vehicle by:
identifying a value that is received from a vehicle element and that is associated with the detected misbehavior condition; and
preventing the identified value from being used in a V2X message to be sent by the vehicle.

15. The V2X processing device of claim 10, wherein the processor is further configured with processor-executable instructions to prevent sending the V2X message related to the detected misbehavior condition in response to detecting the misbehavior condition of the system of the vehicle by:
identifying a vehicle element that is a source of the detected misbehavior condition; and
preventing information from the identified vehicle element from being used in a V2X message to be sent by the vehicle.

16. The V2X processing device of claim 15, further wherein the processor is further configured with processor-executable instructions to add the identified vehicle element to a blocking list indicating that information from the identified vehicle element should not be used for generating V2X messages.

17. The V2X processing device of claim 10, wherein the processor is further configured with processor-executable instructions to:
detect a misbehavior condition of a system of the vehicle comprises by detecting an inconsistency between a radio frequency (RF) profile of an RF module profile and an RF module transmit configuration; and
prevent sending the V2X message related to the detected misbehavior condition in response to detecting the misbehavior condition of the system of the vehicle by preventing sending a V2X message using the RF module transmit configuration.

18. The V2X processing device of claim 10, wherein the processor is further configured with processor-executable instructions to re-calibrate one or more sensors of the vehicle in response to detecting the misbehavior condition of the system of the vehicle.

19. A vehicle-to-everything (V2X) processing device, comprising:
means for detecting a misbehavior condition of a system of a vehicle; and
means for preventing the vehicle from sending a V2X message related to the detected misbehavior condition in response to detecting the misbehavior condition of the system of the vehicle.

20. The V2X processing device of claim 19, further comprising means for transmitting to a management entity a misbehavior report indicating the detected misbehavior condition in response to detecting the misbehavior condition of the system of the vehicle.

21. The V2X processing device of claim 19, wherein means for detecting a misbehavior condition of a system of the vehicle comprises:
means for receiving information from a plurality of information sources of the vehicle; and
means for detecting the misbehavior condition of the system of the vehicle by performing a cross-check of information received from the plurality of information sources of the vehicle to detect an inconsistency within received information.

22. The V2X processing device of claim 21, wherein the plurality of information sources of the vehicle comprises one or more of an in-vehicle network, a vehicle sensor, a vehicle actuator, radio frequency (RF) module, or a previously transmitted V2X message.

23. The V2X processing device of claim 19, wherein means for preventing the vehicle from sending the V2X message related to the detected misbehavior condition in response to detecting the misbehavior condition of the system of the vehicle comprises:
means for identifying a value that is received from a vehicle element and that is associated with the detected misbehavior condition; and
means for preventing the identified value from being used in a V2X message to be sent by the vehicle.

24. The V2X processing device of claim 19, wherein means for preventing the vehicle from sending the V2X message related to the detected misbehavior condition in response to detecting the misbehavior condition of the system of the vehicle comprises:
   means for identifying a vehicle element that is a source of the detected misbehavior condition; and
   means for preventing information from the identified vehicle element from being used in a V2X message to be sent by the vehicle.

25. The V2X processing device of claim 24, further comprising:
   means for adding the identified vehicle element to a blocking list indicating that information from the identified vehicle element should not be used for generating V2X messages.

26. The V2X processing device of claim 19, wherein:
   means for detecting a misbehavior condition of a system of the vehicle comprises means for detecting an inconsistency between a radio frequency (RF) profile of an RF module and an RF module transmit configuration; and
   means for preventing the vehicle from sending the V2X message related to the detected misbehavior condition in response to detecting the misbehavior condition of the system of the vehicle comprises means for preventing the vehicle from sending the V2X message using the RF module transmit configuration.

27. The V2X processing device of claim 19, further comprising means for re-calibrating one or more sensors of the vehicle in response to detecting the misbehavior condition of the system of the vehicle.

28. A non-transitory processor-readable medium having stored thereon processor-executable instructions configured to cause a vehicle-to-everything (V2X) processing device to perform operations comprising:
   detecting a misbehavior condition of a system of a vehicle; and
   preventing the vehicle from sending a V2X message related to the detected misbehavior condition in response to detecting the misbehavior condition of the system of the vehicle.

29. The non-transitory processor-readable medium of claim 28, wherein in the stored processor-executable instructions are configured to cause the V2X processing device to perform operation further comprising transmitting to a management entity a misbehavior report indicating the detected misbehavior condition in response to detecting the misbehavior condition of the system of the vehicle.

30. The non-transitory processor-readable medium of claim 28, wherein in the stored processor-executable instructions are configured to cause the V2X processing device to perform operation such that detecting a misbehavior condition of a system of the vehicle comprises:
   receiving information from a plurality of information sources of the vehicle; and
   detecting the misbehavior condition of the system of the vehicle by performing a cross-check of information received from the plurality of information sources of the vehicle to detect an inconsistency within the received information.

* * * * *